March 4, 1947.  V. H. PAVLECKA  2,416,948

HYDRAULIC TURBINE TYPE TORQUE CONVERTER AND FLUID COUPLING

Filed Oct. 11, 1940  4 Sheets-Sheet 1

INVENTOR,
VLADIMIR H. PAVLECKA.
BY *Lippincott & Metcalf*

ATTORNEY.

March 4, 1947. V. H. PAVLECKA 2,416,948
HYDRAULIC TURBINE TYPE TORQUE CONVERTER AND FLUID COUPLING
Filed Oct. 11, 1940 4 Sheets-Sheet 2

INVENTOR,
VLADIMIR H. PAVLECKA.
BY
Lippincott & Metcalf
ATTORNEYS.

March 4, 1947.  V. H. PAVLECKA  2,416,948

HYDRAULIC TURBINE TYPE TORQUE CONVERTER AND FLUID COUPLING

Filed Oct. 11, 1940  4 Sheets-Sheet 3

INVENTOR,
VLADIMIR H. PAVLECKA.
BY
Lippincott & Metcalf
ATTORNEYS.

March 4, 1947.  V. H. PAVLECKA  2,416,948
HYDRAULIC TURBINE TYPE TORQUE CONVERTER AND FLUID COUPLING
Filed Oct. 11, 1940  4 Sheets-Sheet 4

INVENTOR.
VLADIMIR H. PAVLECKA
BY
Lippincott + Metcalf

Patented Mar. 4, 1947

2,416,948

UNITED STATES PATENT OFFICE 2,416,948

HYDRAULIC TURBINE TYPE TORQUE CONVERTER AND FLUID COUPLING

Vladimir H. Pavlecka, Pacific Palisades, Calif., assignor to Northrop Aircraft, Inc., Hawthorne, Calif., a corporation of California Application October 11, 1940, Serial No. 360,707

13 Claims. (Cl. 60—54)

This invention relates to torque converters or reducing gears for producing large and variable speed changes in power sources, and while the particular form of the device here shown and described in detail is primarily designed for and adapted to aircraft power plants, the device is one of general usefulness and is not limited to this field.

Among the objects of the invention are to provide a torque converter which will reduce the high speed developed by a constant pressure gas turbine to lower speeds which are adapted for aircraft propellers; to provide such a device which will deliver constant power at varying speeds, particularly one which permits the turbine to operate at increasing speed with increasing altitude and which will, at the same time, permit the operation of the propellers at decreasing speed with increasing altitude; to provide a converter which will transmit power from a shaft continuously rotating in one direction to two concentric and oppositely rotating shafts for counter or dual rotational propellers; to provide a device of the character described which will operate with nearly constant efficiency over its entire range of input and output speeds; to provide such a device wherein the speed range may be varied continuously and automatically; and to provide a hydraulic reduction gear whose overall efficiency is at least equal to that of the mechanical gears, clutches and other auxiliaries which it replaces which by virtue of its lightness and flexibility is greatly preferable thereto.

Other objects of my invention will be apparent or will be specifically pointed out in the description forming a part of this specification, but I do not limit myself to the embodiment of the invention herein described, as various forms may be adopted within the scope of the claims.

Considered broadly the converter of my invention comprises a radially discharging centrifugal pump impeller mounted on the primary or drive-shaft from which power is to be taken. The secondary or driven shaft is coaxial with the primary shaft and to it is secured a wheel which carries reaction turbine blades mounted to receive the discharge from the pump impeller. A housing surrounds both wheel and rotor and forms therewith a toroidal passage through which oil or other liquid may circulate in substantially radial planes. This structure is preferably duplicated, in that two secondary shafts are used, the housing preferably being secured to the outer of these shafts and itself serving as a mounting for one of the wheels, and a series of rows of reaction turbine blades are used in the pump discharge, the rows of blades being attached alternately to the two wheels. Means are provided for varying the angles of attack of the respective turbine blades, such means preferably comprising an arcuate piston and piston chamber which rotate with the turbine wheels and are connected through a linkage with the blades, so that by varying hydraulic pressure within the piston chamber the angles may be varied during rotation of the device.

Referring to the drawings.

Figure 6:
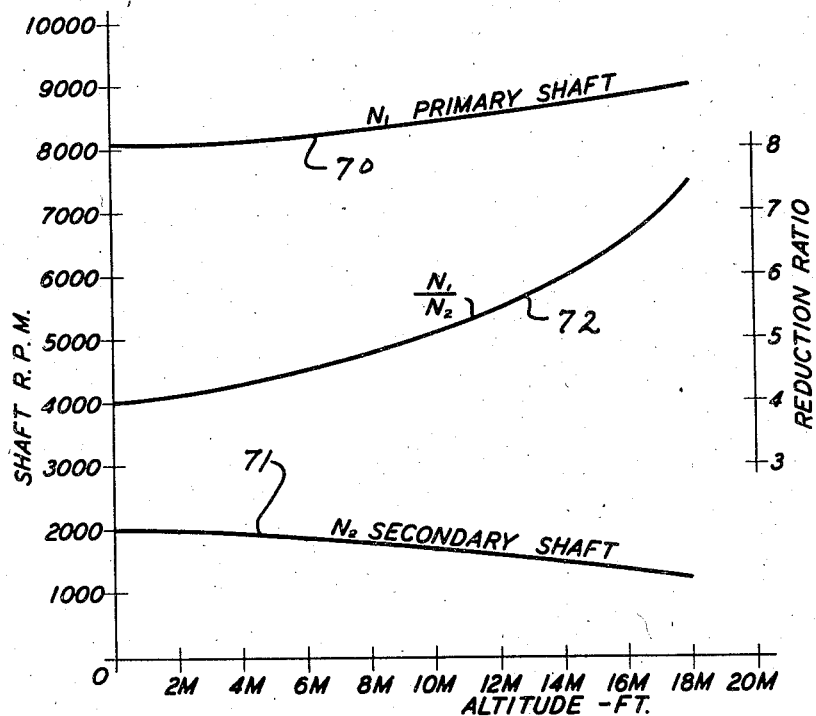
Fig. 6 is a group of curves showing the range of rotational speeds and speed ratios in the various portions of the system.
Figure 8:
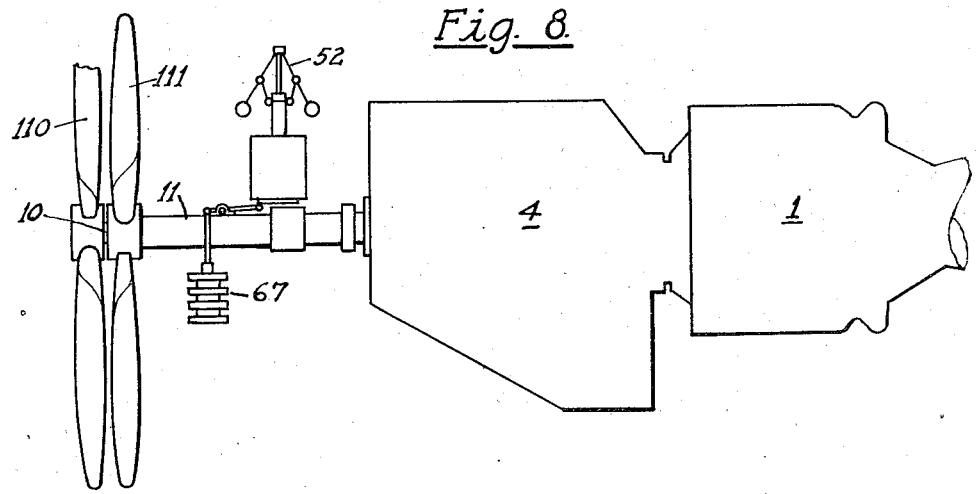
Fig. 8 is a diagrammatic view of the manner in which propellers may be attached to the converter of my invention.

Considering the invention more in detail, the specific embodiment here described is primarily intended for use with a constant pressure gas turbine 1. This type of turbine has the characteristic of constant horsepower output with varying altitude, but in order to maintain the constant output the speed must be permitted to increase with altitude, so that while the primary shaft 2 operates at 8,100 R. P. M. at sea level, at maximum altitude this speed increases to 9,000 R. P. M. On the other hand, the counter-rotational propellers 110 and 111, as shown in Fig. 8 utilized with the turbine, in order to dissipate the same amount of power at maximum efficiency, should make 2,000 R. P. M. at sea level, and their rotational speed should decrease to about 1,200 R. P. M. at maximum altitude. The ratio between the primary and secondary shaft speed ratios therefore varies with altitude in accordance with a complex curve, starting with a 4.05:1 ratio at sea level and ending with a 7.5:1 ratio at the maximum altitude for which the plant is designed. These relationships are shown in the graphs of Fig. 6 and form the basis of the specific design here discussed.

The torque converter proper 3 is mounted coaxially with the primary shaft 2 within a housing 4 forming an oil sump 5 which should be of sufficient capacity to hold the entire volume of low viscosity oil (e. g., "Sperry No. 5") which forms the medium through which the device operates. For the detail of the converter we will next turn to Fig. 2.

The primary shaft 2 terminates within the converter itself and carries adjacent its end a centrifugal pump rotor 7 having strongly recurved impeller blades 9 to provide a discharge having a large radial component of velocity. There is no essential difference between this pump rotor and any other high speed pump; it is obvious that it must be accurately finished and balanced, but the essentials of its design will be found to be completely covered in any good work on centrifugal pump design.

The counter-rotating secondary shafts 10 and 11 are coaxial with the primary shaft 2. The outer shaft 11 is supported by a bearing 12 at its end and secured to it is the converter housing which is formed of two parts, 13 and 13', which are joined at the periphery by bolts 14. A second bearing 15 supports the outboard or turbine end of the housing, surrounding the primary shaft 2. The housing must also be carefully balanced, and should be carefully machined inside and out. The material for the housing is preferably a light high tensile strength alloy of aluminum or magnesium.

Figure 2:
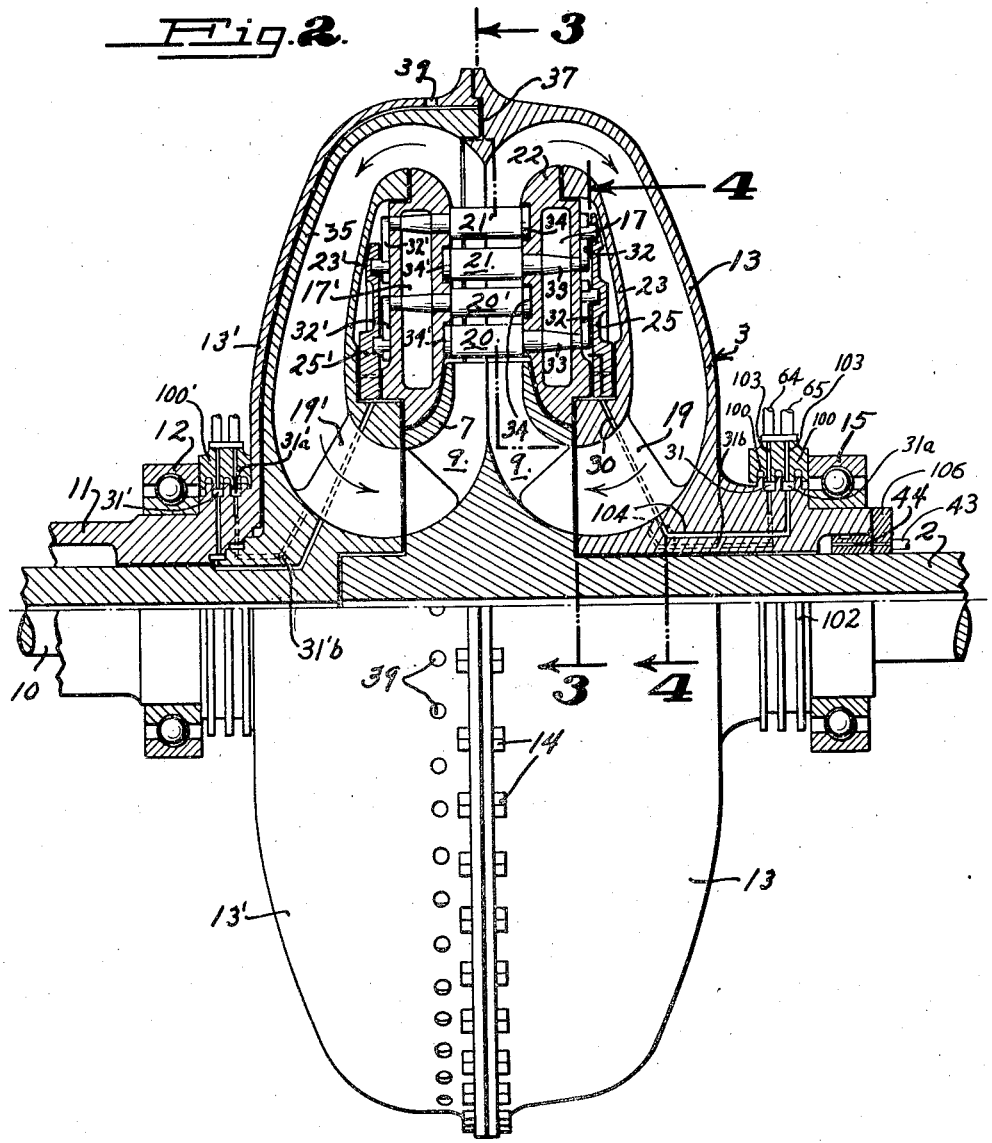
Fig. 2 is a view partly in elevation and partly in axial section through the converter proper.

Mounted within the half 13 of the housing is a turbine wheel 17, carried by spokes 19. The character of these spokes will be discussed hereinafter. In Fig. 2 they are shown in axial planes and as few in number for the purpose of clearness, as a showing in the nature of a working drawing would conceal rather than disclose several of the features which it is desired to make plain. The wheel carries one or more circular rows of turbine blades 20 and 21, pivotally mounted on trunnions 33 to project into the path of the radial flow from the impeller. In Fig. 2 two such rows are shown since this is the preferable design for most applications. The body of the wheel is fully machined so as to permit minimum spacing from the pump rotor, and to offer minimum skin friction to liquid flow over the wheel surface. The combination of wheel and housing thus forms a toroidal channel, passing radially through the orifice of the pump rotor, and then returning over the outer surface of the wheel and back through the spokes 19 into the rotor again. The two parts 22 and 23 which form the rotor are securely fastened together, and together form a casing within which mechanism for varying the angle of the turbine blades 20 and 21 is enclosed.

Figure 4:
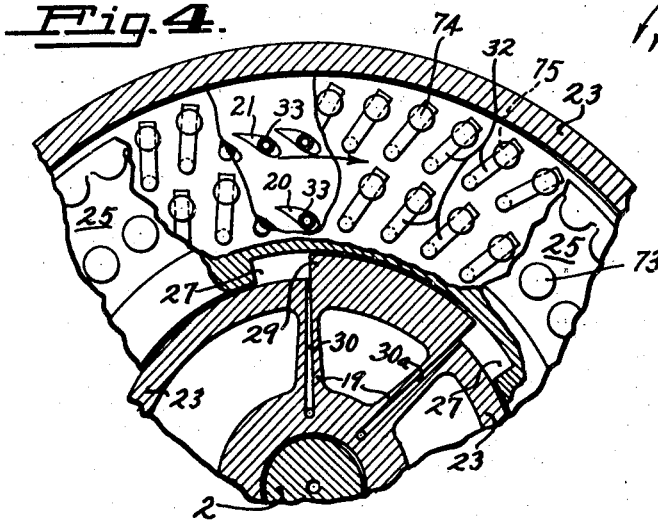
Fig. 4 is a fragmentary sectional view perpendicular to the axis taken in the plane of the lines 4—4 of Fig. 2.

The mechanism for varying the angle of attack of the blades comprises a ring 25 which bears in the recess in the wheel member 23. "Angle of attack" is defined herein as the angle between the line connecting the trailing edge of an airfoil or hydrofoil with the leading edge of an airfoil or hydrofoil (or the focus of the leading edge) and between the mean relative velocity vector, $W_\infty$. As is shown in Fig. 4, the ring is provided on its inner periphery with a plurality of arcuate notches 27, preferably in pairs which are oppositely disposed as by being displaced by an angle of 180° from each other. A smaller arcuate projection 29 on the element 23 fits within the notch 27, the projection subtending a smaller angle than the notch so as to permit an appreciable relative rotation between the ring 25 and the wheel member 23.

The projection and notch respectively form an arcuate piston and piston chamber, which may be moved relatively to each other by oil pressure introduced through the ducts 30 and 30a, connecting the two ends of the piston chamber through certain of the wheel spokes 19 to glands 31 and 31a. The oil can be introduced to glands 31 and 31a by providing a conventional stationary gland portion 100, this portion having recesses 101 into which fit rings 102 separating glands 31 and 31a, and by providing in stationary part 100, oil ducts 103 leading to spaces between rings 102 and thence into rotating ducts 104. The opposite glands 31' and 31a' are supplied in the same manner by gland 100'. Hence by introducing oil pressure to one or the other of these glands the relative rotation before mentioned may be secured.

Figure 3:
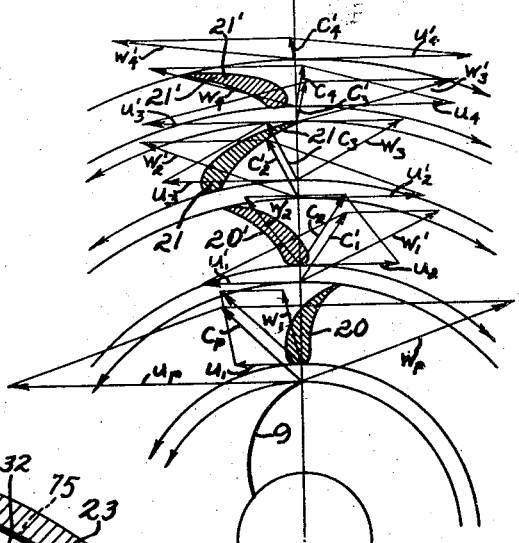
Fig. 3 is a diagrammatic sectional view, transverse to the rotational axis of the device, taken on the line 3—3 of Fig. 2 and showing the relationships between various stages of blading and the vector velocities resulting therefrom.
Figure 9:
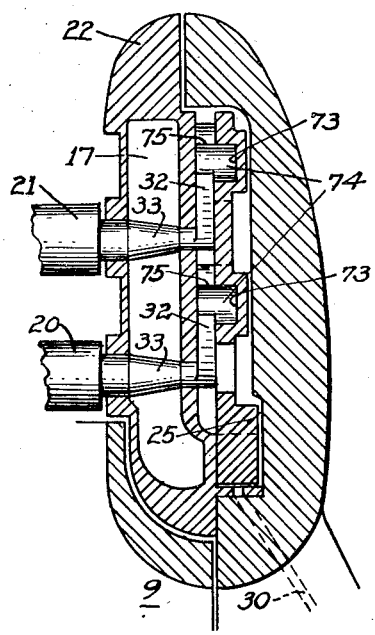
Fig. 9 is a fragmentary sectional view enlarged from Fig. 2 of the mechanism for varying the angle of blade attack.

The control ring 25 contains a plurality of precisely bored cylindrical recesses 73, into which pivot pins 74 rotatably fit at one end, while their other ends are milled with rectangular slots 75, in which move actuating levers 32, with a sliding fit. These levers 32 are on the end of trunnions 33 on which blades 20 and 21 are pivoted as shown in Figs. 2, 3 and 9. When the regulating ring 25 moves, it carries the pins 74 with it and they in turn move the levers 32, which turn trunnions 33 and the blades 20 and 21. While this motion takes place, the levers 32 slide in the slots 75 of the pins and mechanical engagement between the levers and the pins is maintained. It will be seen that relative rotation of the ring and the wheel will therefore change the angles of attack of the blades, and hence the rotational speed of the turbine wheel for a given hydraulic pressure and velocity. It will be noted that by changing the angles of the levers 32 with respect to the blades and slots, or by changing the length of the levers and the separation of their pivots from the blade trunnions, different degrees of change in angle of blade for a given motion of the ring 25, as between different designs of converter, or as between the inner and outer rows of blades, can readily be achieved.

A second turbine wheel 17' is mounted on the end of the inner shaft 10 on spokes 19' facing the turbine wheel 17, and with its blades 20' and 21' mutually interleaved with the blades 20 and 21. In all essentials this second wheel is the same as that just described, the primary variance being that the dimensions are somewhat different to accommodate the interleaving of the blades, and that, because of the different radial spacing of the blades, the angle adjusting levers 32' project outwardly from their pivots to their respective blade trunnions instead of inwardly as is the case with the levers 32. The design principles are, however, essentially the same.

The free or cantilever ends of the turbine blades on each wheel are supported by and pivoted in rings 34, 34', which fit freely in annular grooves in the opposite turbine wheel from that wherein the blades respectively are pivoted. These rings tend to prevent vibration of the turbine blades, and also form rudimentary labyrinth seals which prevent any material by-passing of the oil around the blades.

It is preferable, though not necessary that an inner half housing 35 be provided which is spaced slightly from the outer housing 13'. This inner half housing terminates in a circumferential groove 37 within the half housing 13. The groove and the edge of the half housing 35 together also form a rudimentary labyrinth seal which prevents too rapid passage of the oil between the inner and outer housings. There is, however, a definite channel left for the oil to flow in, and the housing half 13' is provided at intervals with drainage holes 39 through which oil can escape, although not very rapidly. When however, the device is not in operation the oil which it contains will gradually drain out through these holes and back into the sump 5. Furthermore, during operation of the converter there is a constant circulation of oil through these holes from which it is thrown against the sides of the housing 4 and drains back into the sump 5. This circulation permits the dissipation of the very considerable amount of heat representing the (approximately) 10% loss in the operation of the device.

The circulation thus induced is not unduly rapid because the pressure inducing it is mainly that derived from the peripheral velocity acquired after the oil enters the inter-housing channel, for the main body of the oil has had practically all of its peripheral velocity removed in passing through the turbine blades. There is also a pressure component on the oil which is supplied by the apparatus next to be described.

It will be seen that when the converter has been at rest there will be no oil within the housing, and the primary shaft will be free of all connection with the secondary shafts 10 and 11. This is an advantage in that the unloaded turbine may be started much more readily than would be the case were the load always present. When the gas turbine has been started, however, it drives pump 41 through a shaft 42, gear driven from the shaft 2 through gear box 42', and this pump, feeding through a pipe 43 and the shaft gland 44 through stationary rings 106 feeds oil into the converter through the clearance space between the hub portion of part 13 and shaft 2 on one side of the converter, as shown in Fig. 2, more rapidly than it can be dissipated through the drainage or vent holes 39. As oil continues to gather within the housing it is acted upon by the impeller blades 9 and develops a large radial pressure. This pressure and the flow which it produces reacts against the first row of blades 20, causing them to rotate preferably in the same direction as the impeller.

The flow next passes through the second row of reaction blades 20', which have a lower angle of inclination, and urges them in the opposite direction, and thence passes in succession through the successive rows 21 and 21', losing a part of its energy in each row. Action and reaction being opposite and equal, the torque supplied to each of the two shafts 10 and 11 will also be equal and opposite if the reaction blades are properly designed. By such proper design of the successive rows of blades it is possible to remove substantially all of the rotational energy of the oil, so that its final discharge is almost purely radial, this being the condition for maximum efficiency of the device. Its blades being of the reaction type the transfer of energy between the oil and the blades appears as a pressure drop between the periphery of the impeller 7 and the discharge of the outer row of blades 21'.

The velocity vector diagrams of the moving blade cascade is shown in conjunction with Fig. 3, where $u$ designates the peripheral velocity component of the fluid flow at various points in the blade cascade. $w$ designates the so-called relative velocity component of the fluid at various points in the blade cascade. This velocity component is the actual velocity of the fluid with respect to the blade surface and is relative to the blade. $c$ designates the absolute velocity component of the fluid. This component is the geometrical sum of the peripheral velocity of a blade wheel and of the relative velocity of the fluid passing through a blade cascade. These relations are clearly apparent from Fig. 3, and have been set forth in curve form in Fig. 7.

Figure 7:
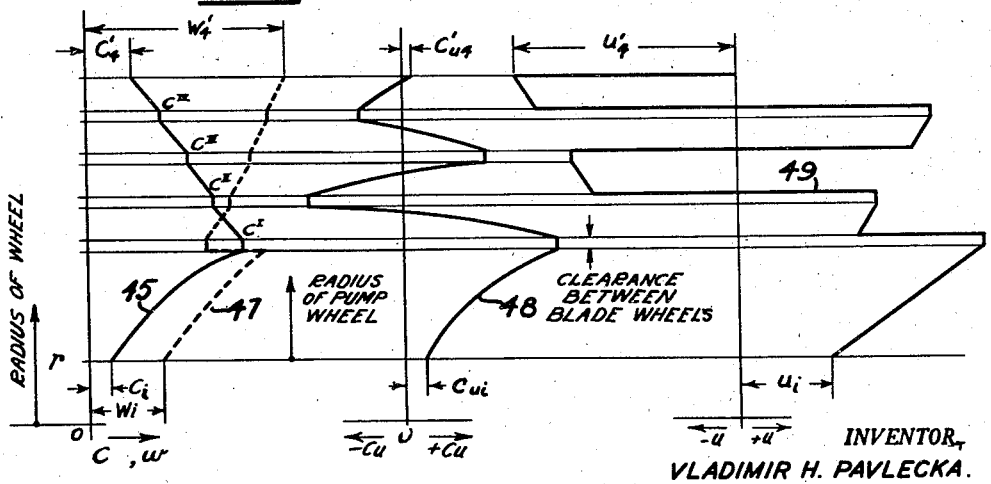
Fig. 7 is another group of curves indicating the variations of velocities within the converter when in operation.

The curves of Fig. 7 illustrate the velocity changes as the fluid passes through the converter, starting with the intake of the pump impeller at the bottom of the curves and ending with the discharge from the blades 21' at the top. Curve 45 represents the changes in absolute velocity C, curve 47 the velocity W relative to the blades, and curve 49 the peripheral velocity $u$. The latter changes in direction from $+u$ to $-u'$, etc., as the oil passes through the successive stages. Curve 48 represents the projection of the absolute velocities on the peripheral velocity vectors.

Figure 1:
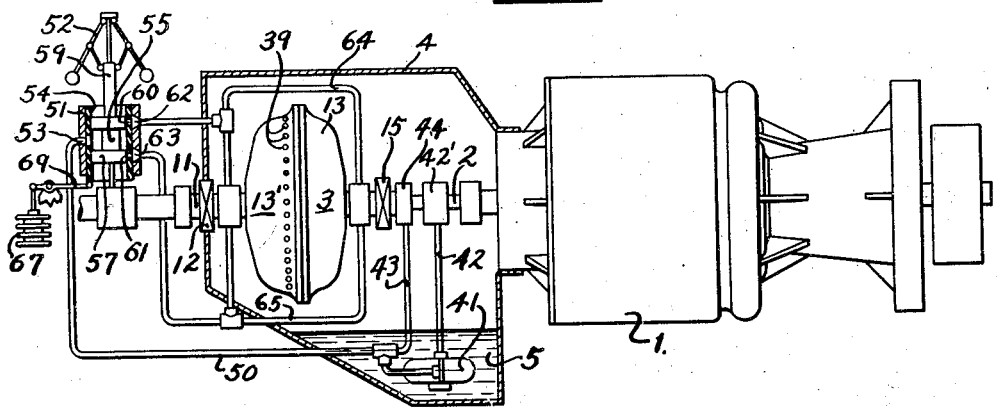
Fig. 1 is a schematic diagram showing the arrangement of the converter with its accessories connected to and driven by a gas turbine.
Figure 5:
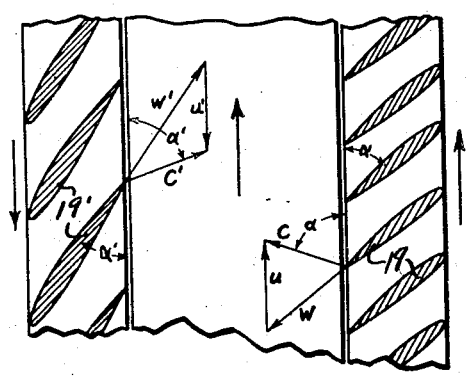
Fig. 5 is another fragmentary view showing schematically the development of a circumferential section through the spokes of the turbine wheels, showing the directions of rotation and flow in both wheels and the pump rotor.

The meaning of various symbols used in Figs. 5 and 7 is as follows:

$c$=absolute velocity of the fluid,
$c_1$=absolute intake velocity into the pump,
$c^{I, II \ldots IV}$=absolute velocities at the entry to the various turbine stages,
$c_4'$=absolute exit velocity from the last turbine stage,
$w$=relative fluid velocity,
$w_1$=relative intake velocity into the pump (immediately behind the intake edge of the pump vanes),
$w_4'$=relative exit velocity from the last turbine stage,
$c_u$=projection of the absolute fluid velocity upon the peripheral velocity vector $u$,
$c_{u1}$=projection of the absolute fluid velocity at the pump intake upon the peripheral velocity vector $u_1$,
$c_{u4}'$=projection of the absolute fluid velocity at the exit of the last turbine stage upon the peripheral velocity vector $u_4$,
$u$=peripheral velocity,
$u_1$=peripheral velocity of the pump intake,
$u_4'$=peripheral velocity of the exit edge of the last turbine stage.

If the toroidal passage which is formed between the turbine wheels and the respective housings be sufficiently smooth, very little swirl will be imparted to the oil by the passage walls. The oil will therefore flow back toward the intake of the pump impeller in the two divided passages substantially in axial planes, and at substantially constant velocity, the width of these passages being increased toward the axis of the device as is shown in order to compensate for the decrease in circumference of the successive sections as the axis is approached.

Since the oil flowing into and between the spokes of the wheels 19 and 19' should be substantially without rotation in space, and since the two wheels are rotating in opposite directions, the respective sets of spokes are given markedly different forms in order that the flow from each side of the device may be substantially the same as it enters the impeller. It is preferable that this flow should have some peripheral velocity in the direction of rotation of the impeller, in order to give the oil a preliminary swirl and so decrease the turbulence and cavitation that might take place at the intake of the impeller blades. The general nature of the differing forms of these spokes is shown in the developed circumferential section of Fig. 5. The central space here represents the intake of the impeller, the arrow showing its direction of rotation. The spokes 19 have the form of aerodynamic vanes and being spaced equidistantly form a vane or blade grid through which oil enters the pump rotor 7.

The oil enters the vane grids in an axial direction, and is accelerated in them by rotating motion to higher absolute exit velocities C and C', Fig. 5. The vane grids also give the oil a peripheral velocity component so that the velocity vectors C and C' at the exit from the vane grids is no longer axial but inclined to the axis in the direction of rotation of the pump rotor. Thereby entry shocks at the pump rotor are diminished and the pump efficiency is increased. The spokes 19' are set at a lower angle of incidence $\alpha$ than spokes 19, in order to produce a higher relative exit velocity $w'$, which added vectorially to the peripheral velocity $u'$ of the wheel 23' produces the absolute exit velocity C'; this latter velocity has the same dimension as, and is directionally a mirror image of the absolute velocity C of the wheel 23. In passing through each of the two sets of spokes energy is imparted to the oil, which energy is subtracted from that taken from the oil by the turbine blades to decrease the power available on the secondary shafts. This is of no material movement, however, as far as the output of the device is concerned, the energy thus transferred and re-transferred being in the nature of a "permanent investment" which is practically without effect on the final output of the device.

The pump 41 besides supplying the oil for power transmission through the conduit 43, also supplies the oil pressure for operating the blade-adjusting mechanism which controls the reduction ratio and the output of the converter, although it will be obvious that a separate pump and oil circulating system could be used for this purpose if desired. A branch pipe 50, taken from the output of the pump 41, leads to the valve chest 51 of a governor 52 which is gear-driven by the outer of the two propeller shafts. Oil governors are well known for controlling turbines of all types, and the detail construction of the governor here used form no part of the present invention, as there are various known types of governor which might be used. The mechanism here shown is therefore to be regarded as symbolic only, the mechanism having been reduced to its lowest terms in the showing so that it is indicative of function rather than construction. In the schematic showing the oil from the pipe 50 is delivered through a port 53 in a valve sleeve 54 to a channel 55 in a valve piston 57 whose position within the sleeve is determined by the centrifugal forces acting on the fly-ball governor 52, being connected therewith by a sliding sleeve 59. Two additional ports 60 and 61 are formed in the valve sleeve 54, and are so spaced that when the valve piston is in its median position within the sleeve both of these ports are just covered by the piston, the ports being separated by the width of the channel 55, so that motion of the piston in either direction will open one or the other of them. Each port opens into an elongated opening or discharge chamber 62 and 63 respectively. One of these discharge chambers connects to a duct 64, the other connects to a duct 65. Duct 64 connects with glands 31 and 31', while duct 65 connects to glands 31a and 31a'. Increase in secondary shaft speed will therefore open the port 60, admit oil into one end of the piston chambers 27 (and the corresponding chamber in the other wheel, which is not shown) and by causing relative rotation between the rings 23 and 23' and wheels 25 and 25' will decrease the angle of attack of the blades and therefore cause reduction in the output speed of the converter. Decrease in speed of the secondary shaft will cause a reverse action, increasing the angle of attack of the blades and thus increasing the secondary shaft speed.

Discharge from the piston chambers is by leakage through the passage between the disc 25 and wheel 23. The discharge passages being small, the resulting friction applies adequate damping. The amount of energy required to accomplish adjustment of angle is small, since the reaction forces on the blades are but slightly unbalanced, and the mechanical advantage of the rings and linkage is large. The unbalance is therefore merely enough to prevent instability and flutter, and does not, in this embodiment, constitute a material restoring force as between the rings and wheel, although it could, if desired, be made controlling. There is therefore no observable difference in speed of action of the governor in increasing or decreasing the angles of attack of the blades. The governor causes the speed of the converter to hunt above and below the normal speed setting, as is desirable to secure sensitive speed control, but the damping is adequate so that the hunting occurs very gradually and through a very narrow speed range.

The normal speed maintained by the governor is determined by the position of the sleeve valve 54. This is shown as being determined by an aneroid capsule 67 which actuates the sleeve through a lever 69. The actual structure of the device may take any of the forms used for barometric controlled governors, e. g., such controls as are used for the automatic operation of superchargers in conventional types of aircraft engines.

The linkage between the barometric control and the governor determines the speed ratio between the primary shaft and the secondary shafts, and is preferably such as to meet the conditions as determined by Fig. 6. Curve 70 shows the variation of primary shaft speed with altitude for constant power output. Curve 71 shows the variation of secondary shaft speed with altitude for best efficiency, the propeller pitch being assumed to be adjusted to proper relation thereto. The barometric control is so set as to give a speed ratio substantially as is shown by the resultant curve 72, as the altitude varies.

Attention is drawn to the fact that as here described only the outer of the output shafts is used for governing the device, although it would be quite possible to use a governor on each shaft and control the attack angles of the two sets of wheel blades independently. The use of a single control is justified by the fact that the action and reaction as between the various sets of blades are equal and opposite, and as a result the torques on the two shafts are necessarily equal. For this reason it might even be possible to make the blades adjustable on only one of the two turbine wheels, although this would result in loss of efficiency, and the use of a single set of adjustable blades is not, therefore, recommended, but its possibility does indicate that errors resulting from the use of a common governor are too slight to warrant the additional weight and expense which would be involved in the use of a double governor.

Another point which should be brought out is the fact that this converter is not reversible; i. e., that if the secondary shaft be rotated by an external source of power there is little tendency to rotate the primary shaft. The device therefore acts in a sense as an over-running clutch or "free-wheeling" device, which up to a certain limit permits the propeller to run at greater speed than that called for by the turbine speed. Above this limit, the turbine begins to act as an effective hydraulic brake for the propellers and will not allow them to overspeed dangerously. In dives power is not consumed in turning the prime mover faster than it would be driven by the fuel fed to it, nor is there any danger of speeding up the prime mover to excessive speeds.

In case of the loss of load by one of the secondary shafts, as, for example, by the loss of one of the two counter-rotating propellers, the unloaded shaft will speed up greatly. The load is not wholly removed from the other shaft under these circumstances, however, and one of the advantages of the device is that a portion of the power still remains available for driving the other propeller, which may permit maneuvering an emergency landing.

I claim:

1. A torque converter comprising a primary shaft, a centrifugal pump rotor secured to said shaft, a secondary shaft, a wheel secured to said secondary shaft, a housing surrounding said wheel and rotor and forming therewith a toroidal passage, reaction turbine blades of airfoil section pivotally mounted to said wheel adjacent the periphery of said rotor to receive radially the discharge therefrom, an annulus mounted within said housing for limited rotation with respect to said wheel, linkage between said blades and said annulus for varying the angle of attack of said blades upon relative rotation of said annulus and said wheel, a piston and piston chamber connecting said annulus and wheel and operative to cause such relative rotation, and means for supplying hydraulic pressure within said piston chamber to vary said angle of attack.

2. A torque converter comprising a primary shaft, a centrifugal pump rotor secured to said shaft, a secondary shaft, a wheel secured to said secondary shaft, a housing surrounding said wheel and rotor and forming therewith a toroidal passage, reaction turbine blades of airfoil section pivotally mounted to said wheel adjacent the periphery of said rotor to receive radially the discharge therefrom, the axes of rotation of said pivotal mountings being displaced from the centers of pressure thereof to cause a slight reaction moment on said pivots, an annulus mounted within said housing for limited rotation with respect to said wheel, linkage between said annulus and said blades for varying the angle of attack of said blades upon relative rotation of said annulus and said wheel, a piston and piston chamber connected between said wheel and annulus to apply pressure therebetween in opposition to the reaction of said blades as transmitted through said linkage, and means for applying hydraulic pressure within said piston chamber to vary the angle of attack of said blades.

3. A torque converter in accordance with claim 2 wherein said pressure applying means comprises an oil pump driven by one of said shafts.

4. A torque converter in accordance with claim 2 including means for varying the application of said pressure in response to the absolute value of the atmospheric pressure.

5. A torque converter comprising a primary shaft, a centrifugal pump rotor mounted on said shaft, a pair of coaxial secondary shafts, a wheel fixed to the inner of said secondary shafts adjacent one side of said rotor, a housing fixed to the outer of said secondary shafts, a second wheel adjacent the other side of said rotor and fixed to said housing, said housing coacting with said rotor and said wheels to form a pair of toroidal passages having a common branch, a circular row of reaction turbine blades of airfoil section on each of said wheels in the common branch of said passages, the rows of blades on the respective wheels being concentric with the rotor and each other to receive successively the radial discharge of said rotor, and an inner semi-housing secured to the inner of said secondary shafts encompassing the wheel affixed thereto, whereby both the inner and outer walls forming the separate branches of said toroidal passages rotate with the same angular velocity.

6. A hydraulic torque converter comprising a primary shaft, a centrifugal pump rotor secured to said primary shaft and having opposite intake ports adjacent the base of said rotor, and connected peripheral exit ports, two secondary shafts one of which is tubular and external to the other secondary shaft, two wheels, one secured to said external secondary shaft and the other secured to said internal secondary shaft, reaction turbine blades of airfoil section secured to said wheels and peripherally adjacent to the periphery of said pump rotor to receive radially the discharge therefrom and held on said wheels in an attitude such that the fluid motion induced by the centrifugal pump will force the turbine wheels to rotate in opposite direction to one another, an annular enclosure peripheral to the exit perimeter of the last radial hydraulic turbine stage and two toroidal ducts extending radially from the said annular space toward the center line of rotation of the converter, each one of the toroidal ducts being defined by the said hydraulic turbine wheels and by an external housing shell rotating along with the respective turbine wheel and forming a casing within which is restricted the operating hydraulic fluid.

7. A torque converter in accordance with claim 6 including spokes for said wheels formed as guiding blades for directing fluid into said rotor with an initial swirl.

8. A torque converter in accordance with claim 1 including means controlled by the speed of said secondary shaft for controlling the admission of said hydraulic pressure into said piston chamber.

9. A torque converter in accordance with claim 1 including means controlled by the speed of said secondary shaft for controlling the admission of said hydraulic pressure into said piston chamber, and means responsive to the absolute value of the atmospheric pressure for varying the rotational speed at which said speed controlled means operates.

10. Apparatus in accordance with claim 6, wherein means are provided to vary the angles of attack of said blades.

11. Apparatus in accordance with claim 6, wherein said turbine blades are rotatable and wherein hydraulic means including an arcuate piston and a hydraulic piston chamber, is provided rotating with the turbine rotors and having its piston connected by a linkage with said blades, and means for varying the pressure in said piston chamber to vary the angles of attack of said blades during rotation.

12. Apparatus in accordance with claim 6, wherein said turbine blades are rotatable and wherein hydraulic means including an arcuate piston and a hydraulic piston chamber is provided rotating with the turbine rotors and having its piston connected by a linkage with said blades, a source of hydraulic pressure, and a governor operated by the outer secondary shaft for varying the pressure in said piston chamber to vary the angles of attack of said blades during rotation.

13. A torque converter comprising a primary shaft and a pair of secondary shafts coaxial therewith, a centrifugal pump rotor mounted on said primary shaft, a pair of radial flow turbine rotors mounted respectively on said secondary shafts, said turbine rotors having mutually interleaved rows of rotatable blades of airfoil section positioned to receive successively the flow from said pump rotor, a housing enclosing all of said rotors, hydraulic means within said housing and mounted for rotation with said turbine rotors, said hydraulic means including an arcuate piston and an hydraulic piston chamber and linkage connecting said piston with said blades, a source of hydraulic pressure, a governor operated by the outer secondary shaft for varying the pressure in said piston chamber to vary the angles of attack of said blades during rotation, and means responsive to the absolute value of the atmospheric pressure and connected to said governor to modify the action of the governor in varying said pressure.

VLADIMIR H. PAVLECKA.

REFERENCES CITED

The following references are of record in the file of this patent:

UNITED STATES PATENTS

| Number | Name | Date |
|---|---|---|
| 1,327,080 | Brown | Jan. 6, 1920 |
| 1,900,120 | Lysholm | Mar. 7, 1933 |
| 1,970,236 | Kluge | Aug. 14, 1934 |
| 2,088,954 | Gregg | Aug. 3, 1937 |
| 2,117,673 | Lysholm | May 17, 1938 |
| 2,140,324 | Lysholm | Dec. 13, 1938 |
| 2,145,005 | Fichtner | Jan. 24, 1939 |
| 2,150,539 | Carson | Mar. 14, 1939 |
| 2,151,075 | Berger | Mar. 21, 1939 |
| 2,168,863 | de Lavaud | Aug. 8, 1939 |
| 2,178,356 | Brunner | Oct. 31, 1939 |
| 2,205,794 | Jandasek | June 25, 1940 |
| 2,217,364 | Halford | Oct. 8, 1940 |
| 2,223,715 | Berger | Dec. 3, 1940 |
| Re. 18,485 | Lysholm | May 31, 1932 |

FOREIGN PATENTS

| Number | Country | Date |
|---|---|---|
| 470,750 | British | 1937 |
| 504,914 | British | 1939 |
| 518,082 | British | 1940 |
| 332,927 | German | 1921 |
| 406,325 | German | 1924 |
| 408,781 | German | 1925 |
| 613,838 | German | 1935 |
| 94,287 | Swiss | 1922 |